United States Patent
Mishima et al.

(10) Patent No.: US 6,657,176 B2
(45) Date of Patent: Dec. 2, 2003

(54) ON-VEHICLE IMAGE PICK-UP APPARATUS AND METHOD OF SETTING IMAGE PICK-UP DIRECTION

(75) Inventors: Tomoyuki Mishima, Nagoya (JP); Masayoshi Imoto, Nagoya (JP); Takayuki Tomida, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/827,941

(22) Filed: Apr. 9, 2001

(65) Prior Publication Data
US 2001/0035490 A1 Nov. 1, 2001

(30) Foreign Application Priority Data

Apr. 12, 2000 (JP) ........................ 2000-110646
Jun. 13, 2000 (JP) ........................ 2000-176819
Jun. 30, 2000 (JP) ........................ 2000-197767

(51) Int. Cl.$^7$ .................... H01L 27/00; H04N 7/00; H04N 7/18; H04N 9/47; G02B 5/124
(52) U.S. Cl. .................... 250/208.1; 348/118; 348/148; 359/533
(58) Field of Search .............. 250/208.1, 216; 315/77; 348/335, 333, 337, 118, 148; 359/507, 533, 843

(56) References Cited

U.S. PATENT DOCUMENTS

| | | | | | |
|---|---|---|---|---|---|
| 5,619,036 A | * | 4/1997 | Salvio et al. | ........ | 348/148 |
| 5,708,857 A | * | 1/1998 | Ishibashi | ........ | 348/118 |
| 5,756,988 A | * | 5/1998 | Furuta | ........ | 250/208.1 |
| 6,166,764 A | * | 12/2000 | Sakata | ........ | 348/148 |
| 6,314,364 B1 | * | 11/2001 | Nakamura | ........ | 340/995 |
| 6,399,688 B1 | * | 6/2002 | Iida | ........ | 428/429 |
| 6,400,405 B2 | * | 6/2002 | Tomida et al. | ........ | 348/118 |

FOREIGN PATENT DOCUMENTS

| | | |
|---|---|---|
| JP | 6-344827 A | 12/1994 |
| JP | 10-81173 A | 3/1998 |

* cited by examiner

*Primary Examiner*—Georgia Epps
*Assistant Examiner*—Alicia M Harrington
(74) *Attorney, Agent, or Firm*—Oliff & Berridge, PLC (57) ABSTRACT

A prism for reflecting rays of light 17L and 17R incident from left and right image pick-up directions on the rear side of the direction of travel A is disposed in parallel to the vertical direction of a vehicle. The image pick-up optical axis of an image pick-up unit 15 is set to tilt vertically and obliquely with respect to a horizontal plane C, whereby the images in the respective image pick-up directions which are obliquely above or below the horizontal plane are picked up by the image pick-up unit 15.

8 Claims, 10 Drawing Sheets

ON-VEHICLE IMAGE PICK-UP APPARATUS AND METHOD OF SETTING IMAGE PICK-UP DIRECTION

BACKGROUND OF THE INVENTION

1. Field of the Invention

The present invention relates to an on-vehicle image pick-up apparatus for picking up a dead angle area on left and right sides on the forward or backward side of a vehicle and a method of setting an image pick-up direction.

2. Description of the Related Art

When an automobile approaches an intersection, normally it will be necessary for a driver to ensure safety on left and right sides. At any intersection offering poor lateral visibility, however, the driver has had to cause the vehicle to enter the intersection zone a little bit so as to make sure of safety on left and right sides. Consequently, the driver needs paying careful attention to moving the vehicle into the intersection zone and also making sure of safety by directly watching scenes on both the left and right sides after entering the intersection zone, which has mentally given the driver a burden.

In order to reduce the aforementioned burden, there have recently been proposed a system of displaying images on the left and right sides of a vehicle, which images are picked up by image pick-up sensors such as CCDs fitted in the holes bored in the respective sides of an automotive bumper and displayed on a display unit such as a two-plane television installed in the vehicle; and a system of simultaneously displaying images on the left and right sides of a vehicle on a display unit provided in the vehicle by attaching a single image pick-up sensor onto the periphery of an automotive bumper or front glass and simultaneously taking in scenes on the left and right sides of the vehicle by means of the image pick-up sensor.

For example, JP-A-10-81173 discloses the formed system, whereas JP-A-6-344827 discloses the latter system.

Figure 13:
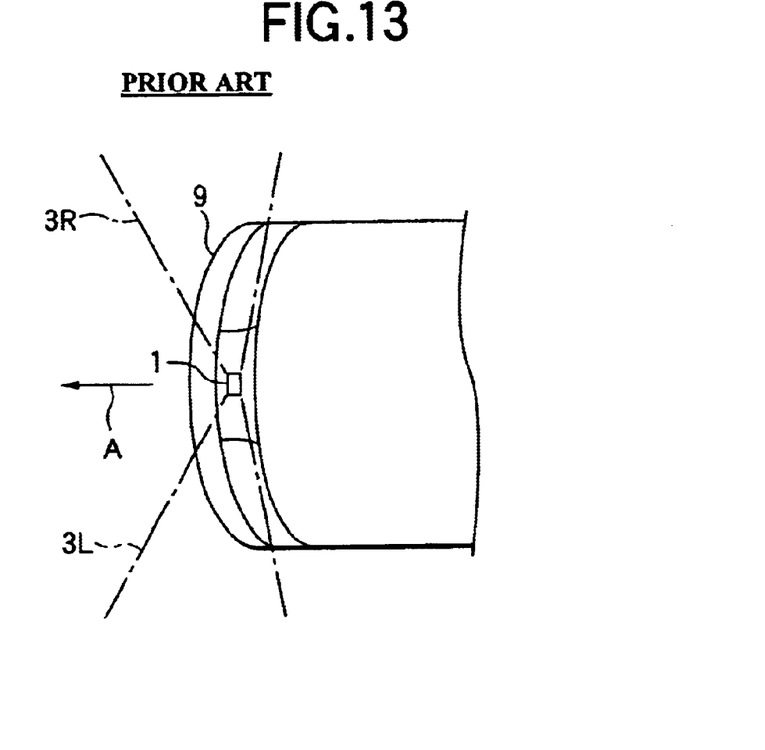
FIG. 13 is a diagram of an example of arranging conventional on-vehicle image pick-up apparatus in a vehicle.
Figure 14:
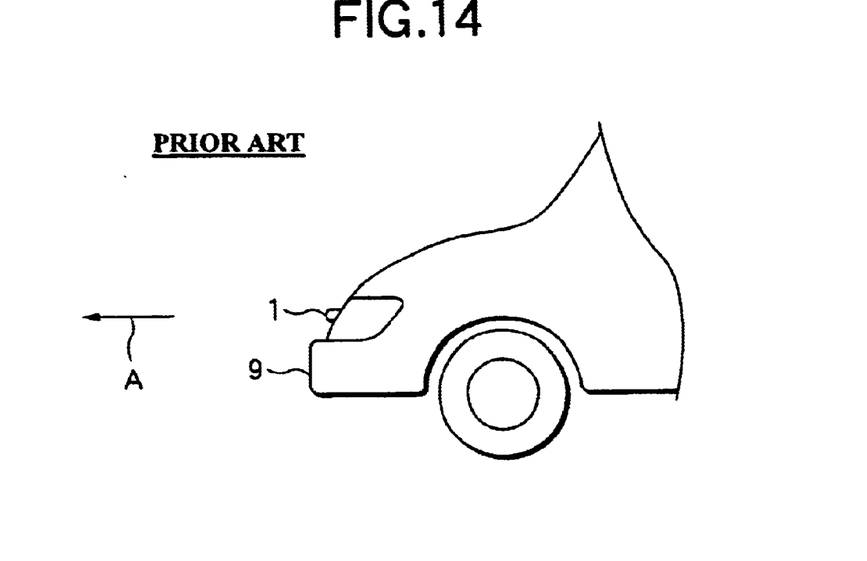
FIG. 14 is a diagram of an example of arranging the conventional on-vehicle image pick-up apparatus.

As shown in FIGS. 13 and 14, there has been proposed an apparatus for watching around a vehicle wherein images in the image pick-up directions 3L and 3R corresponding dead angles respectively on both left and right sides in the direction of travel A of a vehicle are picked up by an image pick-up apparatus 1 installed in the front end portion (front grille in this case) of the vehicle and utilized for driving. Such an image pick-up apparatus 1 may otherwise be installed in the rear end portion of a vehicle in order to pick up images in image pick-up directions corresponding dead angles in the direction of moving back a vehicle.

Figure 15:
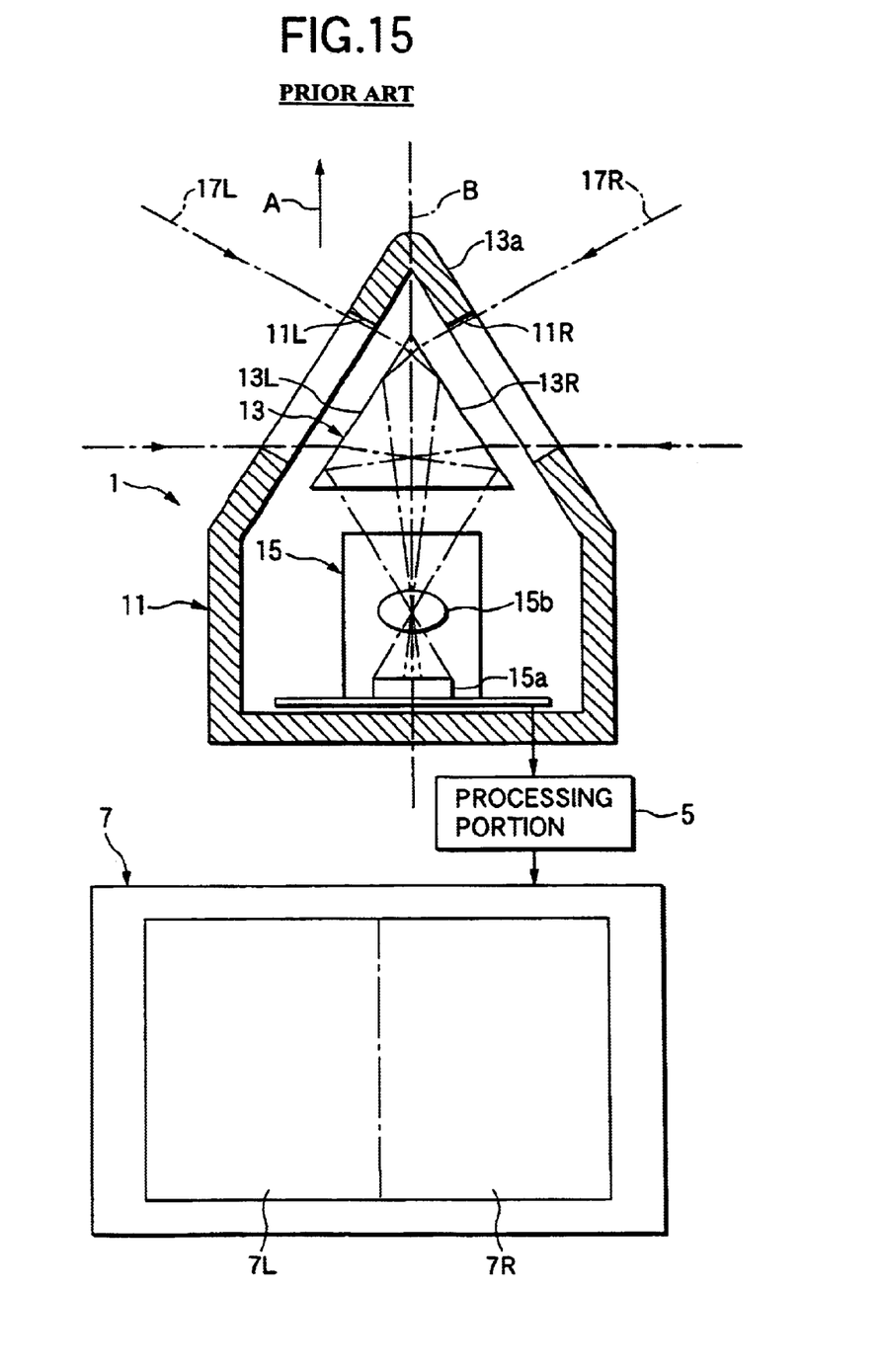
FIG. 15 is a block diagram showing the conventional apparatus.
Figure 16:
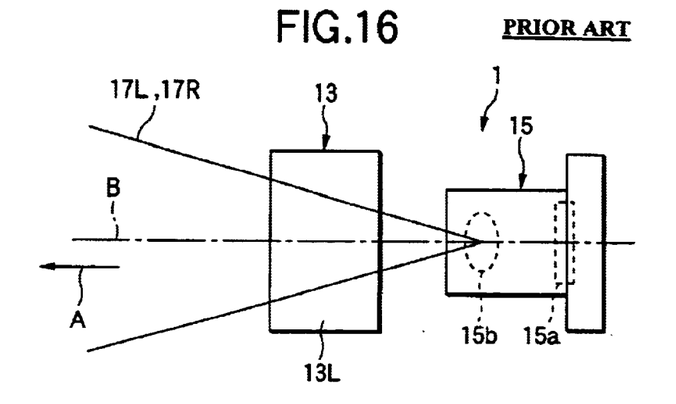
FIG. 16 is a side view of the construction of the principal part of FIG. 15.

FIG. 15 is a block diagram showing the structure of a conventional apparatus for watching around a vehicle; and FIG. 16, a side view of the principal part of what is shown in FIG. 15. The apparatus for watching around a vehicle comprises a image pick-up apparatus 1, a processing portion 5, and a display unit 7 installed within a vehicle.

The image pick-up apparatus 1 has a light shielding case 11 provided with a pair of transmission windows 11L and 11R on both the respective sides thereof. In this case 11 exists an isosceles triangular prism (a reflective unit) 13 in cross section which is housed and placed in such a posture that its vertical angle side faces the front part of the case 11 (upper portion of the case 11 in FIG. 15) and that the lateral sides (first reflective surfaces) 13L and 13R of the prism corresponding to the isosceles of the isosceles triangle faces the respective transmission windows 11L and 11R. An image pick-up unit (an image pick-up unit) 15 is also housed so that it is positioned on the back side of the prism 13. The image pick-up unit 15 is equipped with an image pick-up element 15a and an image forming lens 15b disposed in the optical paths of rays of light 17L and 17R between the image pick-up element 15a and the prism 13.

Rays of light 17L and 17R incident from the image pick-up directions 3L and 3R on the lateral sides of the vehicle are incident onto the prism 13 via the both sides 13L and 13R of the prism, respectively. Then the rays of light 17L and 17R are wholly reflected from the respective sides 13L and 13R of the prism, and the optical paths are changed to directions substantially opposite to the direction of travel of the vehicle before being emitted from the prism 13 and incident on the image pick-up element 15a. Thus, images in the respective image pick-up directions 3L and 3R on both left and right sides are picked up by the single image pick-up element 15a.

An image signal that is output from the image pick-up element 15a is input to the predetermined processing portion 5 and subjected to a predetermined process such as an inversion process. The processed image signal is supplied to the display unit 7, whereby the images in the image pick-up directions 3L and 3R are displayed by the image pick-up element 15a on the respective display areas 7L and 7R of the display unit 7.

The prism 13 in the conventional apparatus for watching around a vehicle is disposed in the case 11 so that both sides 13L and 13R of the prism may be laterally symmetrical with respect to the direction of travel A and in parallel to the vertical direction of the vehicle. Moreover, the image pick-up optical axis B of the image pick-up unit 15 is set parallel to the direction of travel A so that it may not lean to a horizontal plane C (see FIG. 17).

Figure 17:
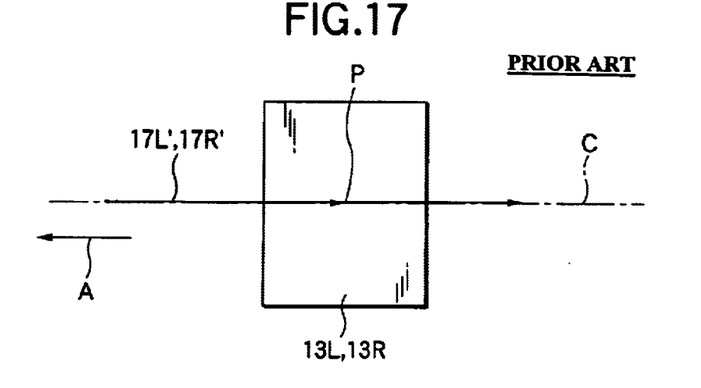
FIG. 17 is a diagram showing the way of reflection of rays of light from left and right image pick-up direction on the sides of a prism in the construction of FIG. 15.

Accordingly, rays of light 17L' and 17R' on the incident optical axes out of the rays of light 17L and 17R that are reflected from the respective sides 13L and 13R of the prism 13 and incident from the image pick-up directions 3L and 3R are reflected at the reflective position P of the sides 13L and 13R of the prism and incident on the image pick-up unit 15 while the rays of light 17L' and 17R' are kept parallel to the horizontal plane C.

In the conventional apparatus for watching around a vehicle, images in the lateral image pick-up directions 3L and 3R are consequently picked up in such a state that the image pick-up optical axes defining the image pick-up directions 3L and 3R have been set parallel to the horizontal plane C.

Figure 18:
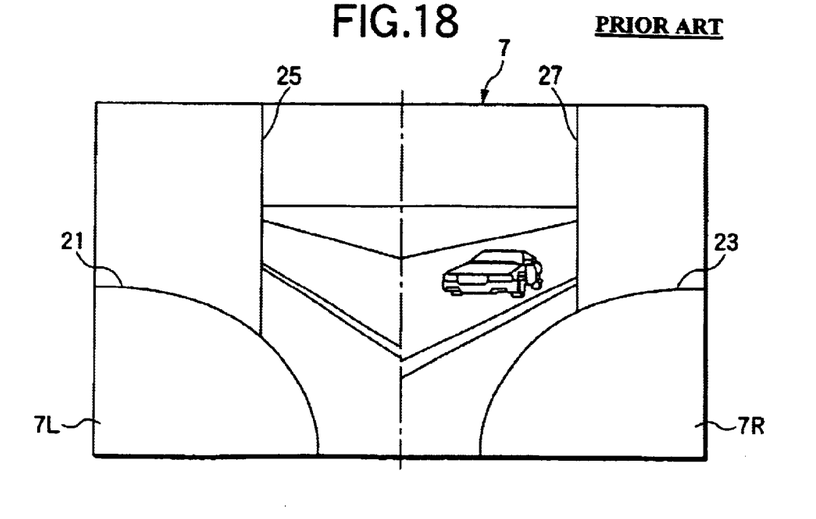
FIG. 18 is a diagram showing that the picked up images are displayed on a display unit.

FIG. 18 illustrates the state in which the picked up images are being displayed on the display unit 7 in the conventional apparatus for watching around a vehicle. In FIG. 18, reference numerals 21 and 23 refer to the bumper 9 of the vehicle; and 25 and 27 refer to images of the obstacles positioned on both left and right sides of the vehicle.

In the apparatus for watching around a vehicle like this, there is a case where the adjustment of the image pick-up directions 3L and 3R may be necessary by tilting them vertically with respect to the horizontal plane so as to obtain more useful peripheral images depending on the condition of installation of the image pick-up apparatus 1 including the position of installation of the image pick-up apparatus 1 on the vehicle, the configuration of the vehicle (configuration of the grille or the bumper 9 in particular) around the position of installation of the image pick-up apparatus and its periphery and so forth.

In the conventional apparatus for watching around a vehicle, however, the images 21 and 23 of the bumper 9 on the picked up image plane are too large in percentage and wasteful as shown in FIG. 18 under the influence of the conditions of installation of the image pick-up apparatus 1. Therefore, it is necessary to restrain the bumper 9 from being taken too much by correcting the image pick-up directions 3L and 3R upward.

As a method of changing the image pick-up directions 3L and 3R upward or downward in the conventional apparatus for watching around a vehicle, what is considered effective is to install the whole image pick-up apparatus 1 tilting in the vertical direction of the vehicle and to change the image pick-up directions 3L and 3R upward or downward by adjusting the angle of inclination.

However, there arises an inconvenience under the method stated above in that under an image of any pick-up object (e.g., building or telegraph pole) that actually uprightly exists is picked up and displayed as it is tilting with respect to the vertical direction.

This is due to the fact that when the image pick-up apparatus 1 is installed in the tilted condition, the sides 13L and 13R of the prism as the reflective surfaces of the prism 13 are also tilted with respect to the vertical direction, whereby the tilted image of the pick-up object is taken on the sides 13L and 13R of the prism when it is reflected from the sides 13L and 13R of the prism.

Although there is another method of changing the image pick-up directions 3L and 3R upward or downward with respect to the horizontal plane C by tiltably disposing the prism 13 in the vertical direction while the image pick-up optical axis B of the image pick-up unit 15 is held in parallel to the direction of travel A, the upright image is caused to tilt by the tilting of the sides 13L and 13R of the prism.

In addition, the following problems might occur in the conventional image pick-up apparatus.

1) Such an image pick-up sensor has been embedded in the bumper or fitted to the periphery of the front glass inside the vehicle, the heat radiation efficiency of the image pick-up sensor is poor and this has caused the performance of the image pick-up sensor to be lowered in high-temperature environment in summer. Consequently, it has been needed to improve the heat resistance of the image pick-up sensor, and a heat sink and the like used to cope with this situation have resulted in increasing the number of parts.

2) In case where rain drops, washing water drops and like stick to the outer surface of such a transmission window because of the rain falling, vehicle body washing and like, it is feared that the pick-up image may be disturbed by the refraction and scattering of rays of light caused thereby.

SUMMARY OF THE INVENTION

In view of the foregoing problems, an object of the present invention is to provide an on-vehicle image pick-up apparatus capable of setting image pick-up directions obliquely upward or downward with respect to a horizontal plane without causing an image of an upright pick-up object to be tilted and a method of setting image pick-up directions.

Another object of the present invention is to provide an on-vehicle apparatus for watching around a vehicle which keeps vehicle design unaffected while securing a sufficient visual field around a vehicle and is also adapted to improve heat radiation efficiency.

Still another object of the present invention is to provide a vehicular image pick-up apparatus for allowing less-disturbed images around a vehicle to be obtained.

According to the invention, there is provided an on-vehicle image pick-up apparatus comprising a reflective unit which is provided in the front or rear end portion of a vehicle and has two first reflective surfaces for reflecting rays of light incident from image pick-up directions on both left and right sides of the vehicle respectively in a direction substantially parallel to the longitudinal direction of the vehicle, and an image pick-up unit for picking up images in the respective image pick-up directions by taking in the rays of light reflected in the reflective unit and is characterized in that the first reflective surfaces of the reflective unit are disposed in parallel to the vertical direction of the vehicle; the image pick-up optical axis of the image pick-up unit is set so that the incident optical axes of the rays of light may tilt vertically and obliquely with respect to a horizontal plane when the rays of light reflected in the reflective unit are introduced into the image pick-up unit, whereby the images in the respective image pick-up directions which are obliquely above or below the horizontal plane are picked up by the image pick-up unit.

Preferably, the reflective unit is an isosceles triangular prism in cross section with its vertical angle side directed to the forward or rearward side of the vehicle; and the left and right sides of the prism corresponding to the isosceles of an isosceles triangle out of the three sides of the prism function as the two first reflective surfaces.

Preferably, the image pick-up unit includes an image pick-up element whose light receiving axis is so arranged as to be parallel to a vertical plane which is parallel to the longitudinal direction, the image pick-up element receiving rays of light reflected in the reflective unit, and an image forming lens disposed in optical paths of the respective rays of light between the image pick-up element and the reflective unit and is characterized in that the direction of the light receiving axis of the image pick-up element is rotated and adjusted while being held to be parallel to the vertical plane, whereby the incident axis is set to tilt vertically and obliquely with respect to the horizontal plane.

Preferably, the image pick-up unit includes a reflective member such that the normal direction of its second reflective surface is so arranged as to be parallel to a vertical plane which is parallel to the longitudinal direction; and rays of light reflected in a direction substantially parallel to the longitudinal direction are reflected from a second reflective surface in a direction substantially parallel to the vertical direction, an image pick-up element for receiving the rays of light reflected in the reflective member, and an image forming lens disposed in optical paths of the respective rays of light between the image pick-up element and the reflective unit and is characterized in that the direction of at least one of the normal of the reflective surface of the second reflective surface of the reflective member and the light receiving axis of the image pick-up element is rotated and adjusted while being kept parallel to the vertical plane, whereby the incident optical axis is set to tilt vertically and obliquely with respect to the horizontal plane.

According to the present invention, there is provided a method of setting the image pick-up directions of on-vehicle image pick-up apparatus comprising a reflective unit which is provided in the front or rear end portion of a vehicle and has two first reflective surfaces for reflecting rays of light incident from image pick-up directions on both left and right sides of the vehicle respectively in a direction substantially parallel to the longitudinal direction of the vehicle, and an image pick-up unit for picking up images in the respective image pick-up directions by taking in the rays of light reflected in the reflective unit and is characterized in that the reflective surfaces of the reflective unit are disposed in parallel to the vertical direction of the vehicle; and the image pick-up optical axis of the image pick-up unit is set so that the incident optical axes of the rays of light may tilt vertically and obliquely with respect to a horizontal plane when the rays of light reflected in the reflective unit are introduced into the image pick-up unit, whereby the image pick-up directions are set by adjusting the angle between the incident axis and the horizontal plane.

Moreover, according to the present invention, there is provided an on-vehicle apparatus for watching around a vehicle comprising an image pick-up unit for picking up an image on at least one of the forward, left and right sides of a vehicle whereby to display the image thus picked up on a display unit provided in the vehicle and to control the movement of the vehicle by processing the image and is characterized in that the image pick-up unit is fitted to an opening grille formed outside a vehicular radiator.

The on-vehicle apparatus for watching around a vehicle described may include a cooling fan installed inside the opening grille and used for cooling the radiator.

Moreover according to the present invention, there is provided a vehicular image pick-up apparatus for picking images around a vehicle by receiving rays of external light passing through image pick-up transmission windows disposed in a manner facing the outside of the vehicle, wherein a transparent hydrophilic film is formed on the outer surface of each of the image pick-up transmission windows.

Preferably, the hydrophilic film is a film having a contact angle of 20 degrees or smaller with water and more specifically, a titanium photo-catalytic film is usable.

DETAILED DESCRIPTION OF THE PRESENT INVENTION

Figure 1:
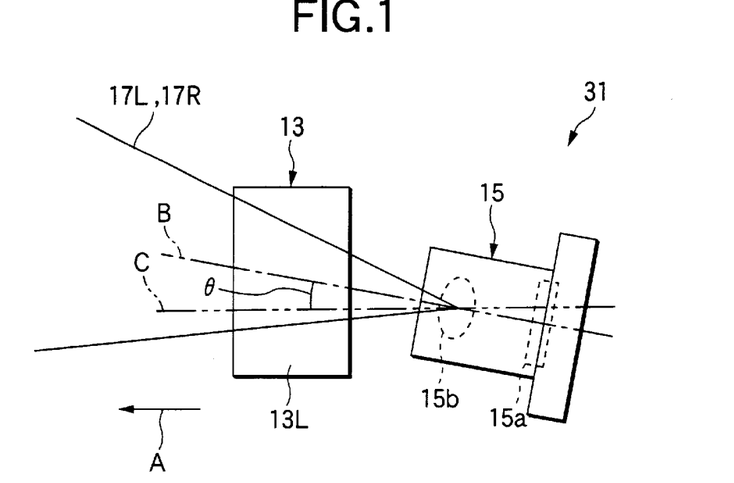
FIG. 1 is a side view showing the construction of the principal part of an on-vehicle image pick-up apparatus according to a first embodiment of the present invention.

The present invention will be described in detail with reference to the accompanying drawings.
First Embodiment FIG. 1 is a side view showing the construction of the principal part of an on-vehicle image pick-up apparatus embodying the present invention; and FIG. 2, a plan view of the construction of FIG. 1. What makes an on-vehicle image pick-up apparatus 31 different from the on-vehicle image pick-up apparatus 1 provided to the conventional apparatus for watching around a vehicle shown in FIG. 15 is in respect of the arrangement of an image pick-up unit 15, wherein like reference characters are mutually given to corresponding parts and the description thereof will be omitted. Like the conventional on-vehicle image pick-up apparatus 1, the on-vehicle image pick-up apparatus 31 according to this embodiment of the invention is also provided in the front or rear end portion of a vehicle and together with a display unit 7 and the like constitutes an apparatus for watching around a vehicle.

Figure 2:
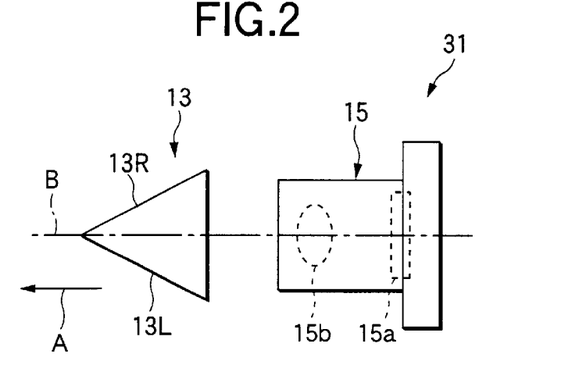
FIG. 2 is a plan view of the construction of FIG. 1.

In the on-vehicle image pick-up apparatus 31 according to this embodiment of the invention, a prism 13 is disposed so that sides 13L and 13R of the prism are set parallel to the vertical direction of the vehicle as shown in FIGS. 1 and 2. The incident optical axes (i.e., the image pick-up optical axis B of the image pick-up unit 15) of rays of light 17L and 17R when the rays of light 17L and 17R reflected in the prism 13 are introduced into the image pick-up unit 15 are set to vertically tilt (upward in this case) at an angle Θ of inclination with respect to a horizontal plane C, whereby images are picked up by the image pick-up unit 15 in image pick-up directions 3L and 3R obliquely upward or downward (obliquely upward in this case) with respect to the horizontal plane C.

According to the first embodiment of the invention, the light receiving axis of the image pick-up element 15a of the image pick-up unit 15 is set parallel to a vertical plane in parallel to the direction of travel and vertically tilted with the respect to the horizontal plane. Correspondingly, the central axis of an image forming lens 15b is also set coincident with the light receiving axis of the image pick-up element 15a.

Further, the direction of the light receiving axis of the image pick-up element 15a is rotated and adjusted while it is held parallel to the vertical plane, whereby the image pick-up optical axis B is set to tilt vertically (upward in this case) obliquely with respect to the horizontal plane C.

Figure 3:
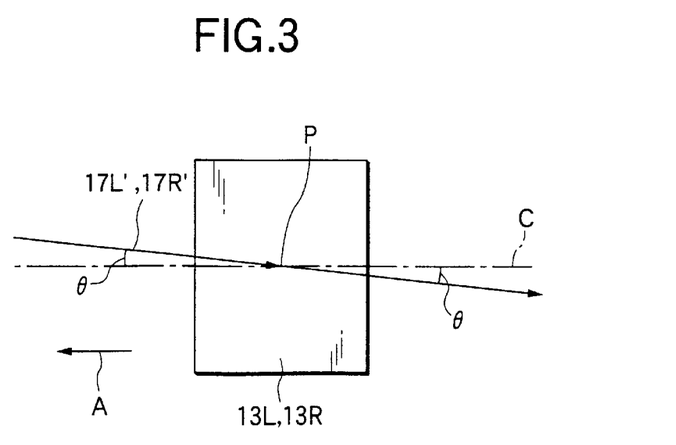
FIG. 3 is a diagram showing that rays of light from left and right image pick-up directions are respectively reflected from the sides and of a prism in the construction of FIG. 1.

Therefore, rays of light 17L' and 17R' on the incident optical axes out of the rays of light 17L and 17R reflected from the respective sides 13L and 13R of the prism 13 in the image pick-up directions 3L and 3R and incident on the image pick-up unit 15 are reflected at the reflective position P of the sides 13L and 13R of the prism and incident on the image pick-up unit 15 in such a state that they have been vertically tilted by an angle of Θ with respect to the horizontal plane C. In other words, the angle between the rays of light 17L' and 17R' before and after being reflected at the reflective position P of the sides 13L and 13R of the prism vertically comes up to 2Θ.

In the on-vehicle image pick-up apparatus 31, the images in the respective image pick-up directions 3L and 3R are consequently picked up while the image pick-up optical axis B defining the image pick-up directions 3L and 3R is set to tilt vertically (upward in this case) with respect to the horizontal plane C.

The image pick-up unit 15 may be held by a predetermined holder provided in the case 11 while the angle Θ of inclination of the image pick-up optical axis B is set at a predetermined value. Otherwise, the image pick-up unit 15 may be held in the case 11 by a holder with the function of adjusting the angle for holding the image pick-up unit 15 rotatably around the axis along the left and right directions of the vehicle.

Figure 4:
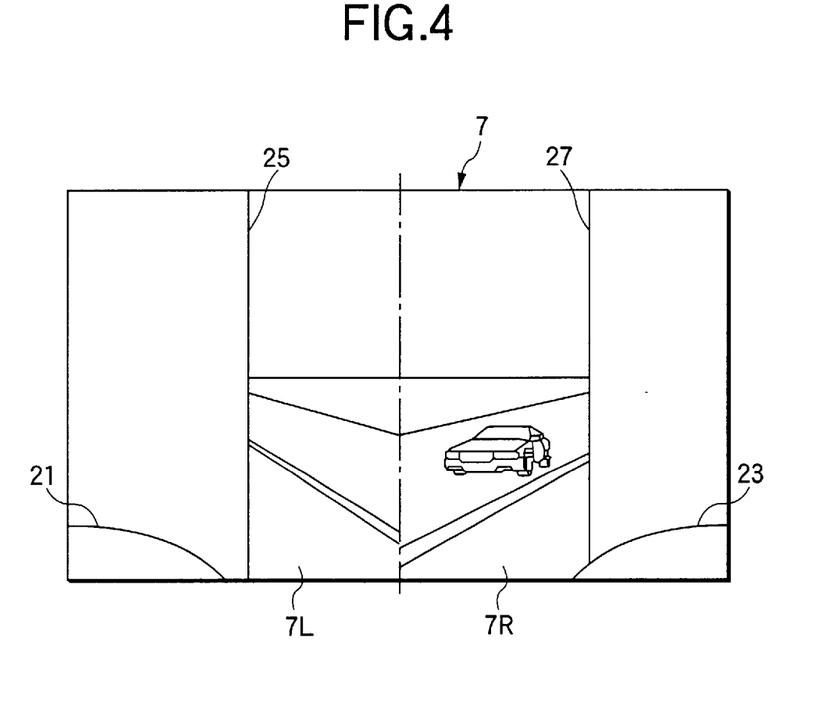
FIG. 4 is a diagram showing images displayed on a display unit, which is picked up by the on-vehicle image pick-up apparatus of FIG. 1.

FIG. 4 shows an image picked up in case where the on-vehicle image pick-up apparatus 31 according to the first embodiment of the invention instead of the image pick-up apparatus 1 in the conventional apparatus for watching around a vehicle shown in FIG. 15. With the image pick-up apparatus 31 according to this embodiment of the invention, the taken images of the bumper 9 are reduced as shown in FIG. 4 as the image pick-up directions 3L and 3R have been set obliquely upward with respect to the horizontal plane. Consequently, the percentage of the images 21 and 23 of the bumper 9 within the images taken is made lower.

As set forth above, according to the first embodiment of the invention, both the sides 13L and 13R of the prism as the reflective surfaces of the prism 13 are arranged so that they may be parallel to the vertical direction and the image pick-up optical axis B of the image pick-up unit 15 is set to tilt vertically (upward in this case) and obliquely with respect to the horizontal plane C. As the images in the obliquely upward or downward (upward in this case) image pick-up directions 3L and 3R with respect to the horizontal plane C are picked up by the image pick-up unit 15, the image pick-up directions 3L and 3R can be set obliquely upward or downward (obliquely upward in this case) with respect to the horizontal plane C depending on the conditions of installation of the on-vehicle image pick-up apparatus 31 in the vehicle without tilting of upright images as objects to be picked up.

Figure 5:
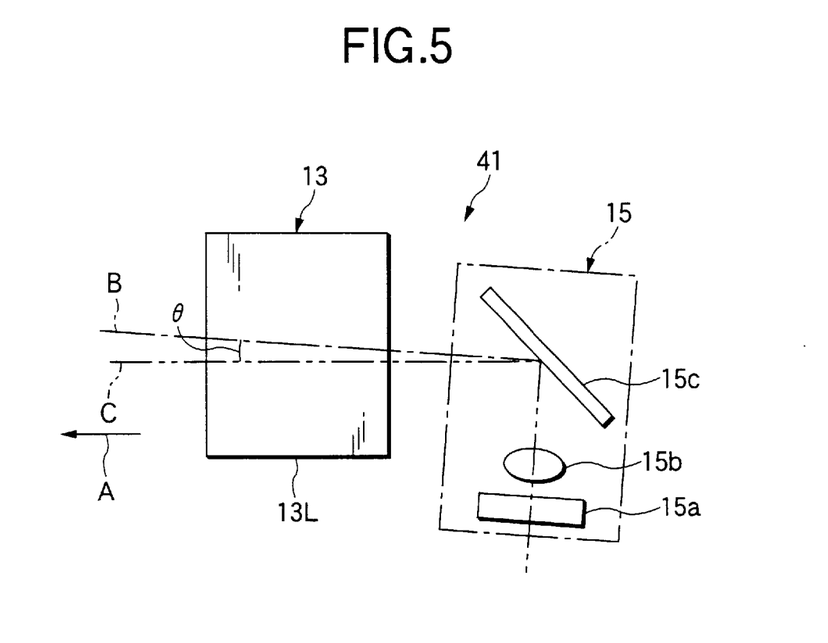
FIG. 5 is a side view showing the construction of the principal part of an on-vehicle image pick-up apparatus as a variation of the on-vehicle image pick-up apparatus of FIG. 1.

FIG. 5 is a side view of the construction of the principal part of an on-vehicle image pick-up apparatus 41 as a modified example of the on-vehicle image pick-up apparatus 31; and FIG. 2, a plan view of the construction of FIG. 5.

Figure 6:
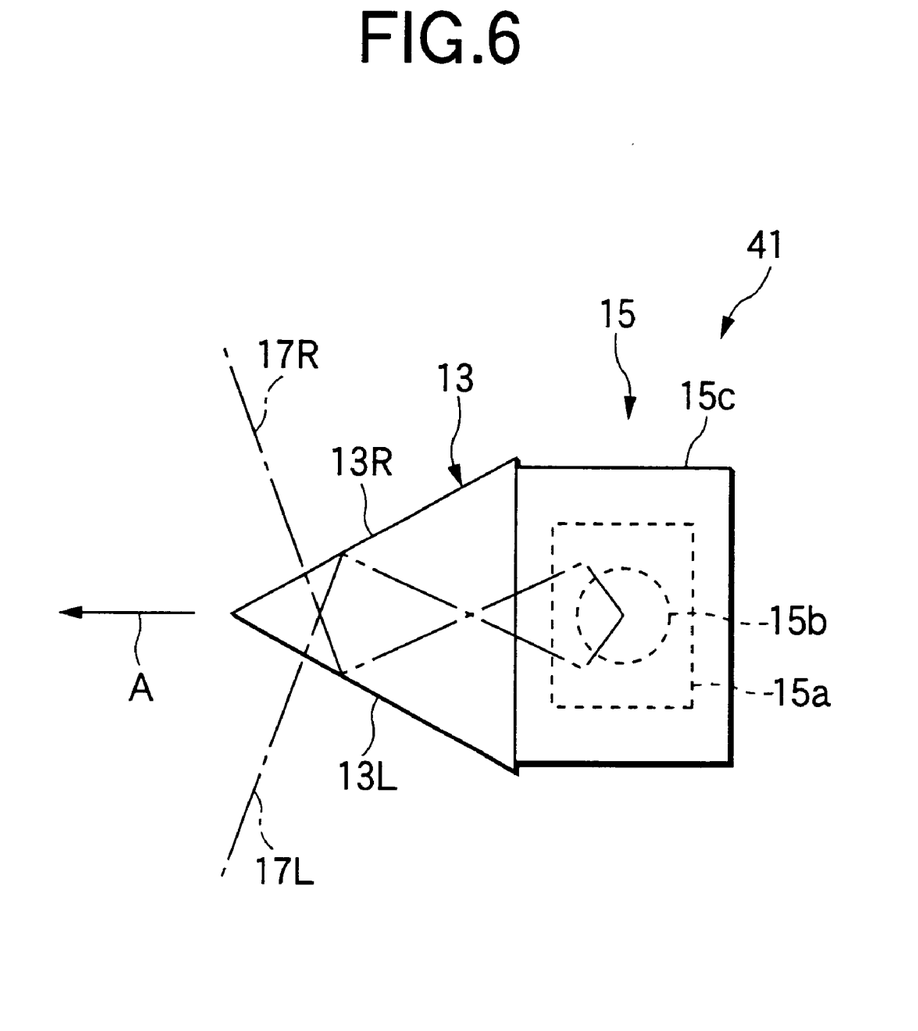
FIG. 6 is a plan view of the construction of FIG. 5.

A reflective member 15c is added to the image pick-up unit 15 in the on-vehicle image pick-up apparatus 41. The reflective member 15c is arranged so that its normal direction of the reflective surface may be set parallel to the vertical plane of the direction of travel A. The rays of light 17L and 17R reflected by the prism 13 in substantially parallel to the direction of travel A are reflected by the reflective surface toward the downward side in the substantially vertical direction. The light receiving axis of the image pick-up element 15a is directed upward in the substantially vertical direction and the rays of light 17L and 17R reflected downward are received by the reflective member 15c Correspondingly, the image forming lens 15b is disposed in order that in the optical paths of the respective rays of light 17a and 17b between the image pick-up element 15a and the reflective member 15c, its central axis coincides with the light receiving axis of the image pick-up element 15a.

Further, the direction of at least one of the normal of the reflective surface of the reflective member 15c and the light receiving axis of the image pick-up element 15a is rotated and adjusted while being kept parallel to the vertical plane in parallel to the direction of travel A, whereby the image pick-up optical axis B of the image pick-up unit 15 is set to tilt vertically (upward in this case) and obliquely with respect to the horizontal plane C.

A preferred method of setting the image pick-up optical axis B includes a method of longitudinally rotating and adjusting the light receiving axis of the image pick-up element 15a in such a state that the normal direction of the reflective surface of the reflective member 15c is set obliquely forward and downward at an angle of 45° with respect to the horizontal plane C; and a method of rotating and adjusting the normal direction of the reflective member 15c vertically in such a state that the light receiving axis of the image pick-up element 15a is directed up the vehicle so as to make the light receiving axis cross the horizontal plane C at right angles.

In this arrangement of the modified embodiment, the rays of light 17L and 17R in the image pick-up directions 3L and 3R are reflected twice from the sides 13L and 13R of the prism 13 and the reflective member 15c and then incident on the image pick-up element 15a. Because any inversion of the left and right images is not produced by the reflection, the advantage is that no image inversion process is necessary in the processing portion 5.

Second Embodiment

Figure 7:
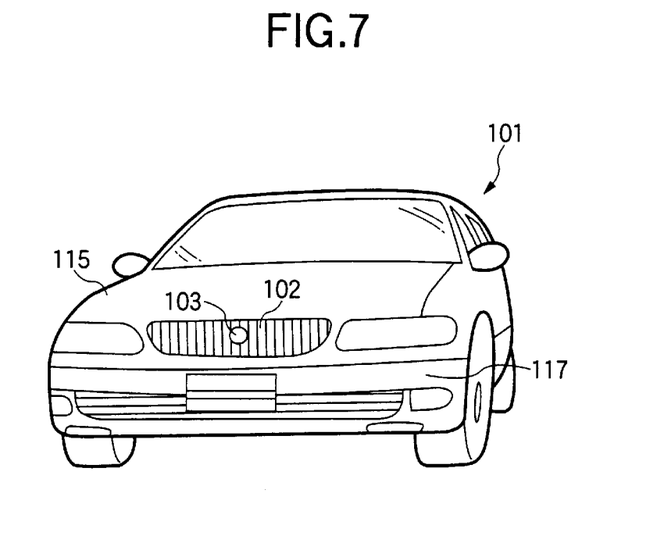
FIG. 7 is an external perspective view showing an image pick-up unit, mounted in an automobile, of an on-vehicle apparatus for watching around a vehicle according to a second embodiment of the invention.
Figure 8:
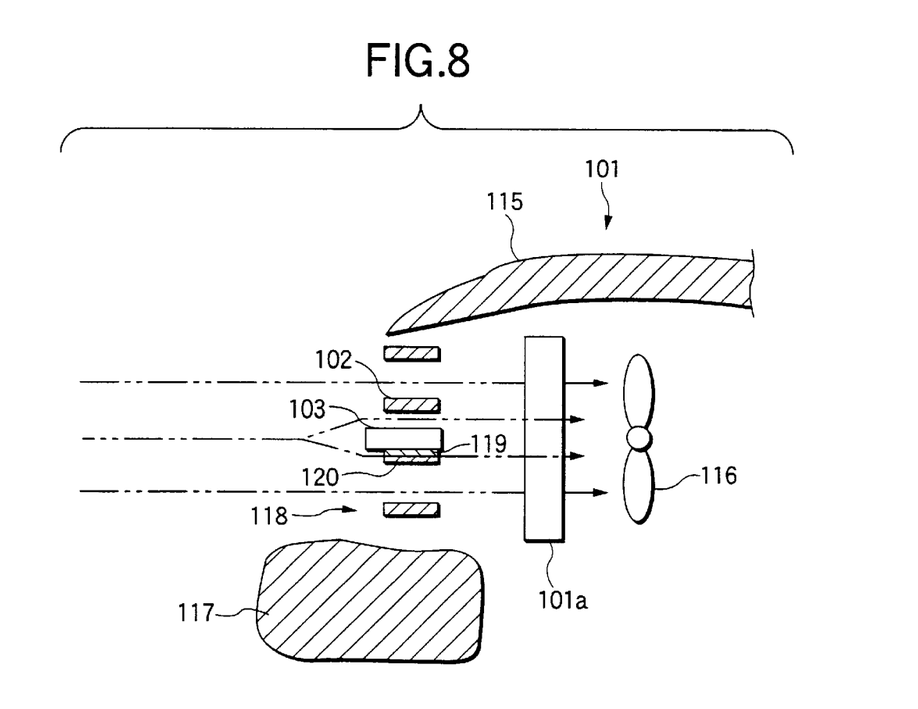
FIG. 8 is a sectional view showing that the image pick-up unit, mounted in the automobile, of the on-vehicle apparatus for watching around a vehicle according to the second embodiment of the invention.

FIG. 7 an external perspective view of an automobile fitted with an image pick-up unit of an on-vehicle apparatus for watching around a vehicle according to a second embodiment of the present invention; FIG. 8, a sectional view of the image pick-up unit mounted in the automobile; and FIG. 9, a diagram showing the overall construction of the on-vehicle apparatus for watching around a vehicle.

Figure 9:
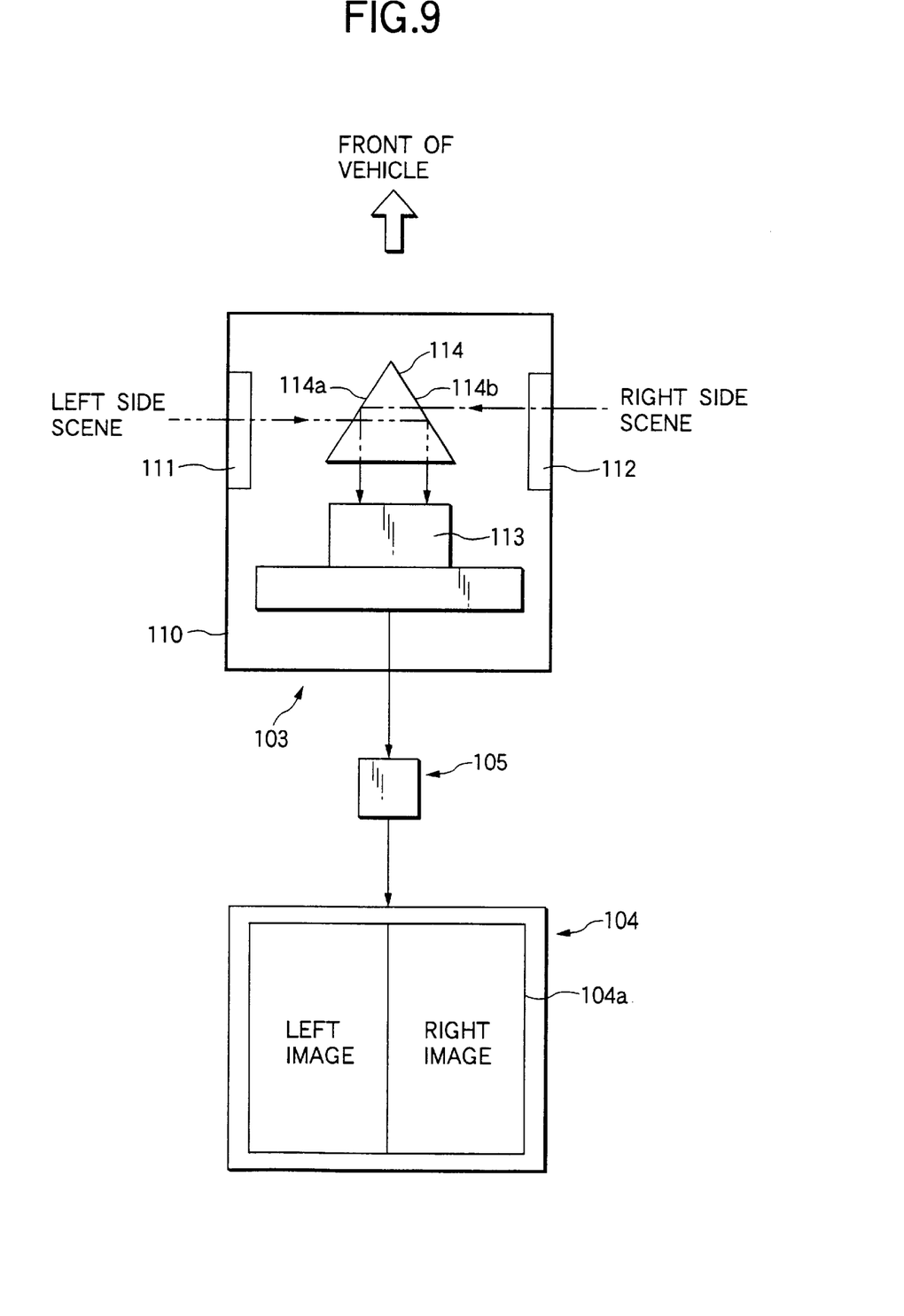
FIG. 9 is a diagram showing the overall construction of the on-vehicle apparatus for watching around a vehicle according to the second embodiment of the invention.

As shown in FIGS. 7 to 9, the on-vehicle apparatus for watching around a vehicle comprises an image pick-up unit 103 provided in such a manner as to be made inconspicuous by, for example, embedding it in the front opening grille (radiator grille) 102 of a radiator 101a in an automobile 101 as an example of the vehicle, a display unit 104 such as an LCD (Liquid Crystal Display), CRT and the like provided in a position where it is easily visible to a driver, that is, in an instrument panel inside the vehicle, and a signal processing portion 105 for converting the image single picked up by the image pick-up unit 103 to a display signal and supplying the display signal to the display unit 104. The signal processing portion 105 also processes the image to control the movement of the vehicle.

As shown in FIG. 9, the image pick-up unit 103 includes a rectangular case body 110 extending along the longitudinal direction of the automobile 101, a pair of lateral transmission windows 111 and 112 of transparent glass fitted to the rectangular opening formed and positioned on both the respective front side openings of the case body 110, a CCD camera 113 as a single image pick-up portion disposed in the case body 110, and a prism body 114 for guiding light onto the image pick-up surface of the CCD camera 121 by reflecting the light introduced through the transmission windows 111 and 112.

At this time, light entering from the left transmission window 111 is passed through one side 114a of the prism body 114 and reflected from the other side 114b thereof before being guided to the right half of the image puck-up surface of the CCD camera 111, whereas light entering from the right transmission window 112 is passed through the other side 114b of the prism body 114 and reflected from the one side 114a thereof before being guided to the left half of the image pick-up surface of the CCD camera 113, so that both the left and right scenes in the respective left and right visual fields are simultaneously picked up thereby.

The image signal picked up by the CCD camera 113 is subjected to a mirror image inversion process in the signal processing portion 105 and supplied to the display unit 104. The right-hand side scene picked up through the right transmission window 112 is displayed in the right half portion in the display portion 104a of the display unit 104 as a right image, whereas the left-hand side scene picked up through the left transmission window 111 is displayed in the left half portion thereof as a left image.

As shown in FIG. 8, a cooling fan 116 for cooling the radiator 101a is installed in the back portion of the radiator 101a housed in the lower front end portion of the bonnet 115 of the automobile 101. An opening grille 102 for taking in cooling air is fitted in the opening 118 between the front end of the bonnet 115 and a bumper 117. The image pick-up unit 103 excluding its front end portion where the transmission windows 111 and 112 are formed is housed in part of the opening grille 102, for example, between adjoining fin portions 102a and bonded to one fin portion 102a by using a predetermined bonding means such as adhesive resin 119. In this case, the cooling fan 116 is automatically actuated when a prescribed temperature sensor (not shown) detects that the temperature of the radiator 101a is rising. Therefore, sufficient cooling air is sucked by the operation of the cooling fan 116 in case where no satisfactory cooling effect is unavailable by natural air during the travel of the automobile 101.

Figure 10:
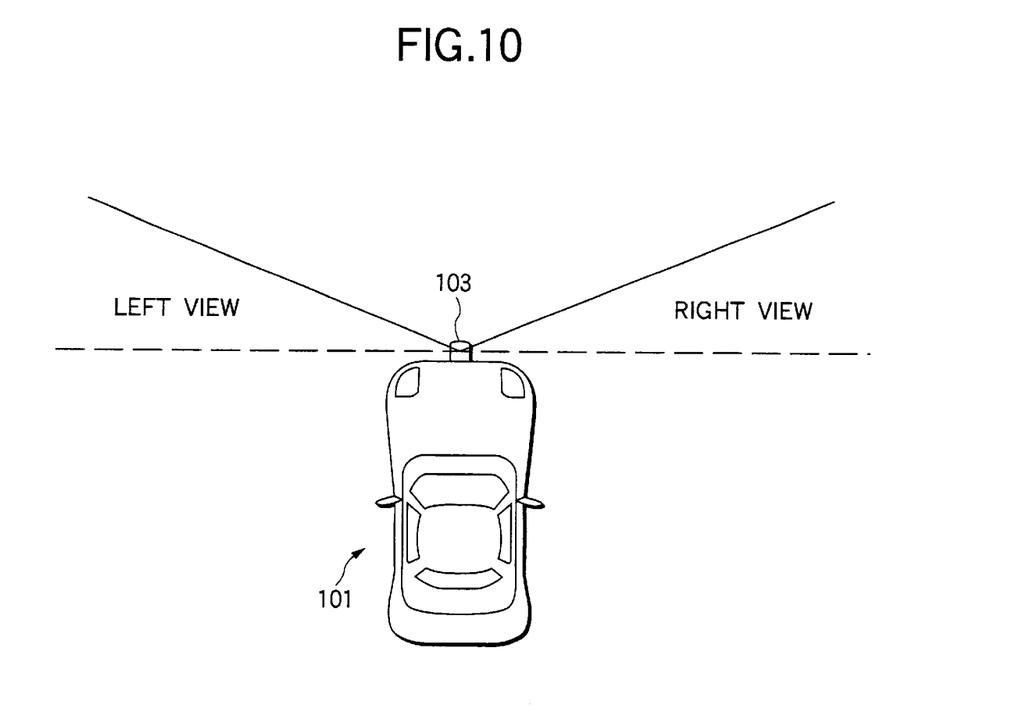
FIG. 10 is a diagram showing how images in the left and right visual fields are taken in by the image pick-up unit.

With the on-vehicle apparatus for watching around a vehicle that is arranged as described above, the left and right scenes in the intersection zone are simultaneously taken in through the respective transmission windows 111 and 112 of the image pick-up unit 103 provided in the opening grille 102 by causing only the front end portion of the automobile 101 to enter the intersection zone at the intersection where the lateral visibility is poor as shown in FIG. 10. As the left and right scenes are simultaneously displayed on the display portion 104a in the display unit 104 (FIG. 9) of the vehicle, the driver can check safety on the left and right sides at the intersection at a time by looking at the display portion 104a, thus making it easy for the driver to confirm the safety.

Since the image pick-up unit 103 is arranged in the opening grille 102 of the opening 118 for taking in cooling air in front of the radiator 101a of the automobile 101, the image pick-up unit 103 is cooled by the natural air flowing into the opening grille 102 and the cooling air forced to be sucked into the opening grille 102 by the cooling fan 116 in addition to the natural air during the travel of the automobile 101, whereby a cooling effect is satisfactorily secured in the image pick-up unit 103. The image pick-up unit 103 provided in the channel of the cooling air is also sufficiently cooled by forcing the cooling air to be sucked into the opening grille 102 even during low-speed traveling or idling at the time of stopping, so that radiation of heat from the image pick-up unit 103 can effectively be conducted.

Since the image pick-up unit 103 excluding it front end portion is provided so that it may be housed between the fin portions 102a, the image pick-up unit 103 never becomes conspicuous from the outside, thus preventing the automotive design from being deteriorated.

Although it has been arranged that the suction type cooling fan 116 is employed and placed on the rear side of the radiator 101a according to the second embodiment of the invention, any push-in type cooling fan 116 may be employed and placed in front of the radiator 101a. Even in this case, as the cooling fan 116 operates to suck cooling air for the image pick-up unit 103 placed in front of the cooling fan 116, whereby the effect of radiating heat from the image pick-up unit 103 is enhanced.

Although the description has been given of what is used to pick up images on both sides around a vehicle as the image pick-up unit 103, it may be the one used to pick up only an image in front of or one side of a vehicle.

The image pick-up unit 103 has been provided in the opening grille 102 in the front end portion of the automobile 101 according to the second embodiment of the invention. In a vehicle model with an engine and a radiator which are mounted in the rear portion of the automobile 101, however, the image pick-up unit may be provided in the opening grille near the radiator or engine in the rear portion of the automobile 101. Even in this case, it is preferable to install such an image pick-up unit in the rear (outside) of a cooling fan for sending or sucking air to or from the radiator or engine. Notwithstanding, the image pick-up unit 103 is used to pick up an image in the backward direction of a vehicle or on both left and right sides of the rear periphery thereof.

Third Embodiment

A third embodiment of the present invention will now be described.

Figure 11:
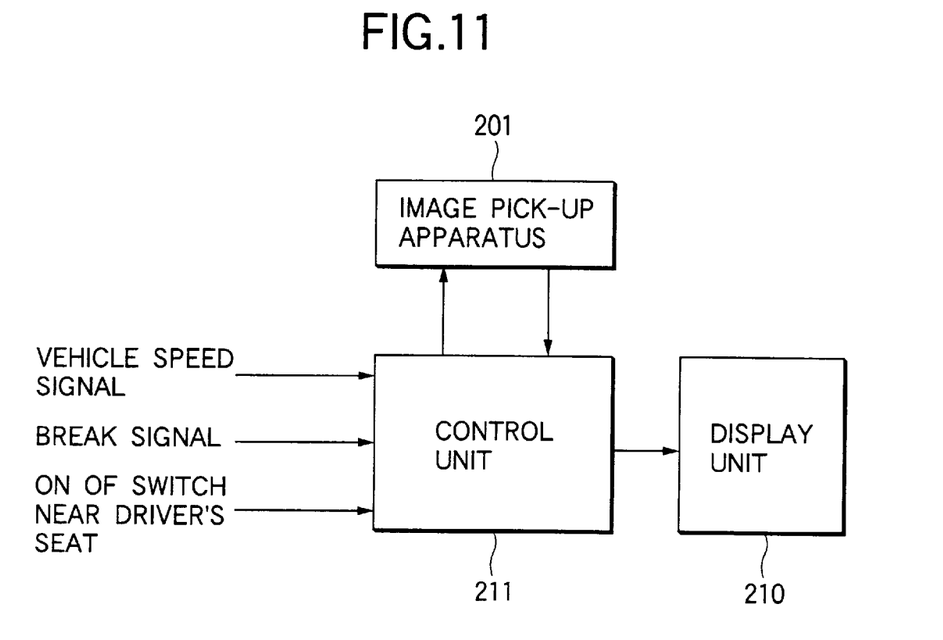
FIG. 11 is a block diagram showing an apparatus for watching around a vehicle according to a third embodiment of the invention.

First, a description will be given of the overall construction of an apparatus for watching around a vehicle to which a vehicular image pick-up apparatus according to the third embodiment of the invention is applied. As shown in FIG. 11, the apparatus for watching around a vehicle is intended to display images obtained by picking up those on left and right sides around a vehicle and equipped with an image pick-up apparatus 201 installed in the front bumper of an automobile as an example of the vehicle, a display unit 210 formed with an LCD, CRT or the like provided in a position where it is easily visible to a driver as in an instrument panel, and a control unit 211 for subjecting an image signal that is output from the image pick-up apparatus 201 to a predetermined process, supplying the processed image signal to the display unit 210 and controlling the on and off states of the image pick-up apparatus 201 and the display unit 210.

Figure 12:
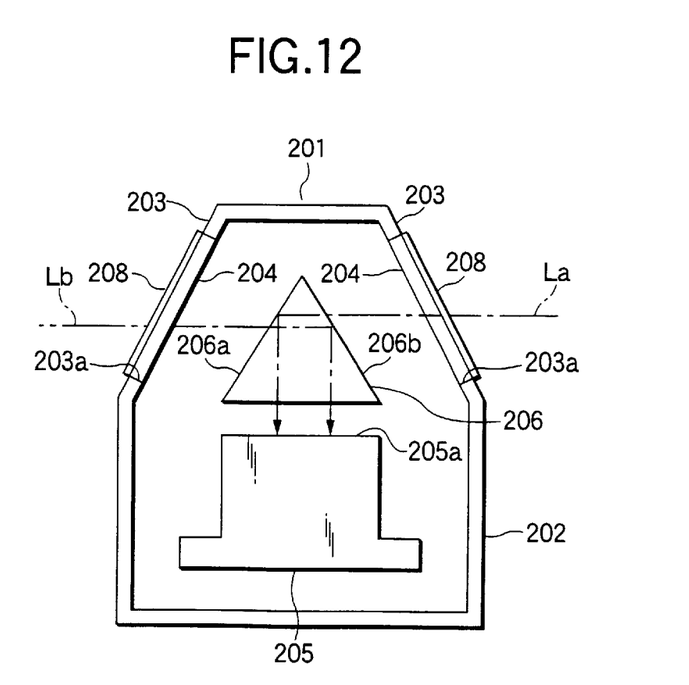
FIG. 12 is a schematic plan view of an image pick-up apparatus.

As shown in FIG. 12, the image pick-up apparatus 201 comprises a case body 202, a camera unit 205 such as a CCD camera incorporating an image pick-up element and a lens, and a substantially isosceles triangular pillar-like prism body 206 in cross section, the camera unit 205 and the prism body 206 being housed and disposed in the case body 202.

The case body 202 is a substantially rectangular parallelepiped in shape whose long sides are extended in the longitudinal direction of the automobile and whose first half portion 203 on both sides are tilted forward from the center of the case body 202. Moreover, a substantially square window opening 203a is formed in the first half portion 203 on both sides of the case body 202. An image pick-up transmission window 204 formed of a transparent glass plate or the like is fitted into each window opening 203a, so that rays of light La and Lb from both the respective sides of the case body 202 can be passed through the respective image pick-up transmission windows 204 and introduced into the case body 202.

The camera unit 205 is housed and disposed in the case body 202 with its incident surface 205a directed forward and simultaneously the prism body 206 is also housed and disposed in the forepart of the case body 202 and in front of the pick-up surface 205a with its base side directed opposite to the pick-up surface 205a.

The ray of light La passed through the right-hand image pick-up transmission window 204 of FIG. 12 and introduced into the case body 202 is reflected from the left side face 206a of the prism body 206 and guided to the left half portion of the incident surface 205a of the camera unit 205, whereas the ray of light Lb passed through the left-hand image pick-up transmission window 204 and introduced into the case body 202 is reflected from the right side face 206b of the prism body 206 and guided to the right half portion of the incident surface 205a of the camera unit 205, whereby images of scenes on both left and right sides can simultaneously be picked up by the single camera unit 205.

The control unit 211 controls the on and off states of the image pick-up apparatus 201 and the display unit 210 through a heretofore known method according to a vehicle speed signal from a vehicle speed sensor (not shown), a signal indicating a brake operating condition, on and off signals of any switch near the driver's seat (e.g., in case where it is decided that an automobile is approaching an intersection, the display unit 210 is caused to display images on both left and right sides of the automobile by turning on the image pick-up apparatus 201 and the display unit 210). Simultaneously, the image signal output from the image pick-up apparatus 201 is subjected to a predetermined process so that the processed image signal can be applied to the display unit 210.

Further, the display unit 210 is adapted to display images on both left and right sides of the automobile according to the image signal applied from the control unit 211.

With the apparatus for watching around a vehicle thus arranged, a transparent hydrophilic film 208 is formed on the outer surface of each image pick-up transmission window 204 in the image pick-up apparatus 201 in order to obtain less-disturbed images from surroundings of the vehicle at the time of rain fall, vehicle body washing and the like. The hydrophilic film 208 is a film having a contact angle of 20 degrees or smaller, preferably 10 degrees or smaller with water, the film 208 being a titanium photo-catalytic film provided with hydrophilic nature through the photo-catalytic action, for example. In case where rain drops, washing water drops and like stick to the outer surface of such a transmission window because of rail fall, vehicle body washing and like, the water drops uniformly spread on the surface of the hydrophilic film 208 to form a thin water film.

With the image pick-up apparatus 201 thus arranged, as water drops sticking to the outer surfaces of the image pick-up transmission windows 204 make thin water films uniformly spreading on the surfaces of the respective transparent hydrophilic films 208, the refraction and scattering of the rays of light La and Lb hardly occur when the rays of light La and Lb pass through the respective image pick-up transmission windows 204 and enter the case body 202. Therefore, it is possible to obtain less-disturbed images around the vehicle after rain fall, vehicle body washing and the like.

Since water drops sticking to the outer surface of each image pick-up transmission window 204 form a thin water film uniformly spread on the surface, the water drops falling onto the image pick-up transmission window 204 are caused to go down along the water film and allowed to easily flow downward by vertically providing the facial direction of the image pick-up transmission window 204. Thus, a relatively thin water film is maintained, whereby less-stained pick-up images are obtainable.

Moreover, the thin water film thus formed is dried quicker and becomes extinct as compared with the case where water drops are sticking on the image pick-up transmission window 204 without the hydrophilic film 208. Hence, the water drops formed on the outer surface of the image pick-up transmission window 204 becomes extinct in a relatively short time even after rain fall and vehicle body washing. Good original images are thus obtainable.

Although the description has been given of the example applied to the apparatus for watching around a vehicle wherein the image pick-up apparatus 201 is designed to pick up images on both left and right sides of the surroundings of a vehicle and to display the images on the display unit 210 within the vehicle according to the third embodiment of the invention, the invention is not limited to such an embodiment. For example, the images obtained from the image pick-up apparatus 201 are subjected to a predetermined imaging process to detect any automobile or the like approaching an intersection from the left or right side whereby to warn the driver in the other vehicle using a buzzer or a voice, or to warn the other approaching vehicle using a radio wave, light, an ultrasonic wave or the like. Otherwise, a radio wave, light, an ultrasonic wave may be used to give notice to a predetermined display unit installed on the road side using an ultrasonic wave or the like.

Although it has been arranged that the rays of light La and Lb from both sides are incident on the incident surface 205a of the camera unit 205 via the prism 206, rays of light in front of the image pick-up surface 205a may be so arranged that they are directly incident on the pick-up surface 205a by disposing the pick-up surface 205a in front of the image pick-up transmission windows 204 having the hydrophilic films 208.

According to the invention, the first reflective surfaces of the reflective unit are disposed in parallel to the vertical direction of the vehicle, and the image pick-up optical axis of the image pick-up unit is set so that the incident optical axes of the rays of light may tilt vertically and obliquely with respect to a horizontal plane when the rays of light reflected in the reflective unit are introduced into the image pick-up unit, whereby the images in the respective image pick-up directions which are obliquely above or below the horizontal plane are picked up by the image pick-up unit. Therefore, the image pick-up directions can be set obliquely upward or downward with respect to the horizontal plane depending on the conditions of installation of the on-vehicle image pick-up apparatus in the vehicle without tilting of upright images as objects to be picked up.

According to the invention, as the image pick-up unit for picking up an image on at least one of the forward, left and right sides of a vehicle is fitted to the opening grille for sending air to the radiator, a high-level effect of radiating heat from the image pick-up unit can be secured. Moreover, the provision of the image pick-up unit in the opening grille will never deteriorate automotive design.

According to the invention, the effect of radiating heat from not only the radiator but also the image pick-up unit is ensured only by actuating the cooling fan.

According to the invention, the vehicular image pick-up apparatus for picking images around a vehicle by receiving rays of external light passing through the image pick-up transmission windows disposed in a manner facing the outside of the vehicle such that the transparent hydrophilic film is formed on the outer surface of each of the image pick-up transmission windows. Therefore, even though rain drops and body washing water drops and the like stick to the outer surfaces of the respective image pick-up transmission windows, the refraction and scattering of the rays of light hardly occur when the rays of light pass through the respective image pick-up transmission windows as the water drops form a thin water film uniformly spread on each hydrophilic film surface. Less-disturbed images around a vehicle are thus obtainable even after rain fall and vehicle body washing.

What is claimed is:

1. An image pick-up apparatus mounted on a vehicle comprising:

a reflective unit provided in a front or a rear end portion of the vehicle, the reflective unit having two first reflective surfaces for reflecting rays of light incident from image pick-up directions on both of a left side and a right side of the vehicle respectively in a direction substantially parallel to a longitudinal direction of the vehicle; and an image pick-up unit for picking up images in the respective image pick-up directions by taking in the rays of light reflected in the reflective unit, wherein the first reflective surfaces of the reflective unit are disposed in parallel to the vertical direction of the vehicle;

an image pick-up optical axis of the image pick-up unit is set so that incident optical axes of the rays of light tilt vertically and obliquely with respect to a horizontal plane when the rays of light reflected in the reflective unit are introduced into the image pick-up unit, wherein the image pick-up unit picks up the images in the respective image pick-up directions which are obliquely above or below the horizontal plane.

2. The image pick-up apparatus as claimed in claim 1, wherein the reflective unit is an isosceles triangular prism in cross section with a vertical angle of the isosceles triangular prism directed to the front or rear end portion of the vehicle; and left and right sides of the prism corresponding to the equal sides of the isosceles triangle of the prism function as the two first reflective surfaces.

3. The image pick-up apparatus as claimed in claim 1, wherein the image pick-up unit comprises:

an image pick-up element whose light receiving axis is arranged to be parallel to a vertical plane parallel to the longitudinal direction, the image pick-up element receiving the rays of light reflected in the reflective unit; and an image forming lens disposed in optical paths of the respective rays of light between the image pick-up element and the reflective unit, wherein the direction of the light receiving axis of the image pick-up element is rotated and adjusted while being held to be parallel to the vertical plane, so that the incident axis is set to tilt vertically and obliquely with respect to the horizontal plane.

4. The image pick-up apparatus as claimed in claim 1, wherein the image pick-up unit comprises:

a reflective member having a second reflective surface, wherein the normal direction of the second reflective surface is arranged to be parallel to a vertical plane which is parallel to the longitudinal direction, the rays of light reflected in a direction substantially parallel to the longitudinal direction are reflected from the second reflective surface in a direction substantially parallel to the vertical direction;

an image pick-up element for receiving the rays of light reflected from the reflective member; and an image forming lens disposed in optical paths of the respective rays of light between the image pick-up element and the reflective unit, wherein the direction of at least one of the normal of the reflective surface of the second reflective surface of the reflective member and the light receiving axis of the image pick-up element is rotated and adjusted while being kept parallel to the vertical plane, wherein the incident optical axis is set to tilt vertically and obliquely with respect to the horizontal plane.

5. A method of setting image pick-up directions of an image pick-up apparatus mounted on a vehicle, the image pick-up apparatus comprising a reflective unit provided in a front or a rear end portion of the vehicle, the reflective unit having two first reflective surfaces for reflecting rays of light incident from image pick-up directions on both of a left side and a right side of the vehicle respectively in a direction substantially parallel to the longitudinal direction of the vehicle; and an image pick-up unit for picking up images in the respective image pick-up directions by taking in the rays of light reflected in the reflective unit, the method comprising:

disposing the reflective surfaces of the reflective unit in parallel to a vertical direction of the vehicle;

introducing the rays of light reflected in the reflective unit into the image pick-up unit;

setting an image pick-up optical axis of the image pick-up unit to tilt incident optical axes of the rays of light vertically and obliquely with respect to a horizontal plane; and adjusting the angle between the incident axis and the horizontal plane to set the image pick-up directions.

6. A image pick-up apparatus for a vehicle comprising:

an image pick-up transmission window disposed to face the outside of the vehicle;

an image pick-up unit for receiving rays of external light passing through the image pick-up transmission window to pick up an image around the vehicle; and a transparent hydrophilic film formed on the outer surface of the image pick-up transmission window to obtain less-disturbed images.

7. The image pick-up apparatus as claimed in claim 6, wherein the hydrophilic film is a film having a contact angle of 20 degrees or smaller with water.

8. The vehicular image pick-up apparatus as claimed in claim 6, wherein the hydrophilic film is a titanium photocatalytic film.

* * * * *